(12) United States Patent
Fuchino

(10) Patent No.: US 8,695,408 B2
(45) Date of Patent: Apr. 15, 2014

(54) DEVICE AND METHOD FOR MEASURING ENGINE TORQUE AND CONTROL PROGRAM

(75) Inventor: Kozo Fuchino, Saitama (JP)

(73) Assignee: Fuchino Co., Ltd., Saitama (JP)

( * ) Notice: Subject to any disclaimer, the term of this patent is extended or adjusted under 35 U.S.C. 154(b) by 623 days.

(21) Appl. No.: 13/056,162

(22) PCT Filed: Jul. 30, 2009

(86) PCT No.: PCT/JP2009/063565
§ 371 (c)(1),
(2), (4) Date: Jan. 27, 2011

(87) PCT Pub. No.: WO2010/013773
PCT Pub. Date: Feb. 4, 2010

(65) Prior Publication Data
US 2011/0130942 A1    Jun. 2, 2011

(30) Foreign Application Priority Data

Jul. 31, 2008  (JP) .................................. 2008-198498

(51) Int. Cl.
*G01M 15/04*  (2006.01)
(52) U.S. Cl.
USPC ..................................................... 73/114.15
(58) Field of Classification Search
USPC .............................. 73/114.13, 114.14, 114.15
See application file for complete search history.

(56) References Cited

U.S. PATENT DOCUMENTS

| 4,301,678 | A | 11/1981 | Full et al. | |
|---|---|---|---|---|
| 6,332,352 | B1 * | 12/2001 | Sano | .......................... 73/114.15 |
| 7,623,955 | B1 * | 11/2009 | Rackmil et al. | ............... 701/115 |
| 8,281,653 | B2 * | 10/2012 | Schrotter | .................... 73/116.02 |
| 2002/0007670 | A1 * | 1/2002 | Sano | ........................... 73/117.3 |

(Continued)

FOREIGN PATENT DOCUMENTS

| JP | 56-168135 A | 12/1981 |
|---|---|---|
| JP | 61026835 A | 2/1986 |

(Continued)

OTHER PUBLICATIONS

Notification from the International Bureau (Form PCT/IB/338) mailed Apr. 21, 2011, together with the English translation of the international preliminary report on patentability (Form PCT/IPEA/409) issued for corresponding International Application No. PCT/JP2009/063565.

*Primary Examiner* — Eric S McCall
(74) *Attorney, Agent, or Firm* — Young Basile Hanlon & MacFarlane P.C.

(57) ABSTRACT

A device for measuring torque of an engine has a torque detecting section for detecting an output torque of engine cylinders, a rotation detecting section for detecting a rotation angle of a rotating section to which a piston of each cylinder is connected, a top mark detecting section for detecting the rotation angle of the piston of each cylinder, and a torque calculating section for estimating torque characteristics of each cylinder on the basis of the following: the signal of the output torque, the rotation angle of the rotating section, the rotation angle of the piston of each cylinder, the number of the cylinders of the engine, and the number of cycles of the engine. The torque calculating section estimates, as torque characteristics of each cylinder, either peak torque of each cylinder or the combustion angle at which the peak torque is attained.

5 Claims, 11 Drawing Sheets

(56) References Cited

U.S. PATENT DOCUMENTS

| | | |
|---|---|---|
| 2006/0293828 A1 | 12/2006 | Ishizuka et al. |
| 2009/0100920 A1* | 4/2009 | Sakayanagi ................ 73/114.15 |
| 2009/0118083 A1* | 5/2009 | Kaminsky et al. ................ 477/5 |
| 2009/0118971 A1* | 5/2009 | Heap et al. ................ 701/102 |
| 2011/0011169 A1* | 1/2011 | Schrotter ................ 73/116.02 |

FOREIGN PATENT DOCUMENTS

| | | |
|---|---|---|
| JP | 08094462 A | 4/1996 |
| JP | 08338755 A | 12/1996 |
| JP | 09229824 A | 9/1997 |
| JP | 2006242146 A | 9/2006 |
| JP | 2007032540 A | 2/2007 |

* cited by examiner

F I G. 1 0
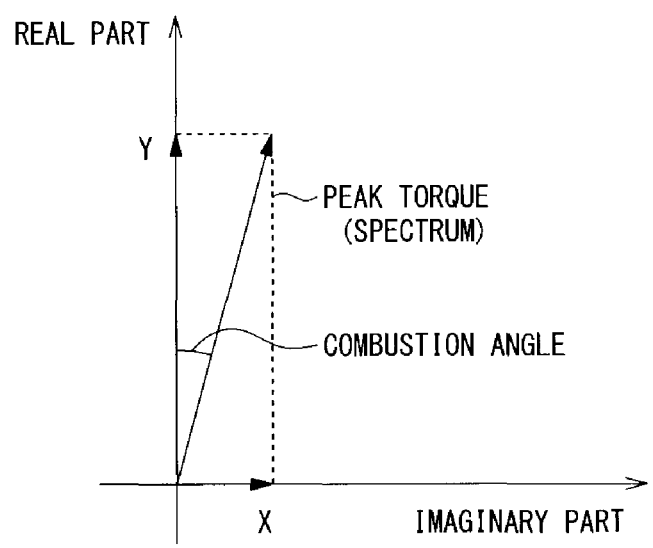

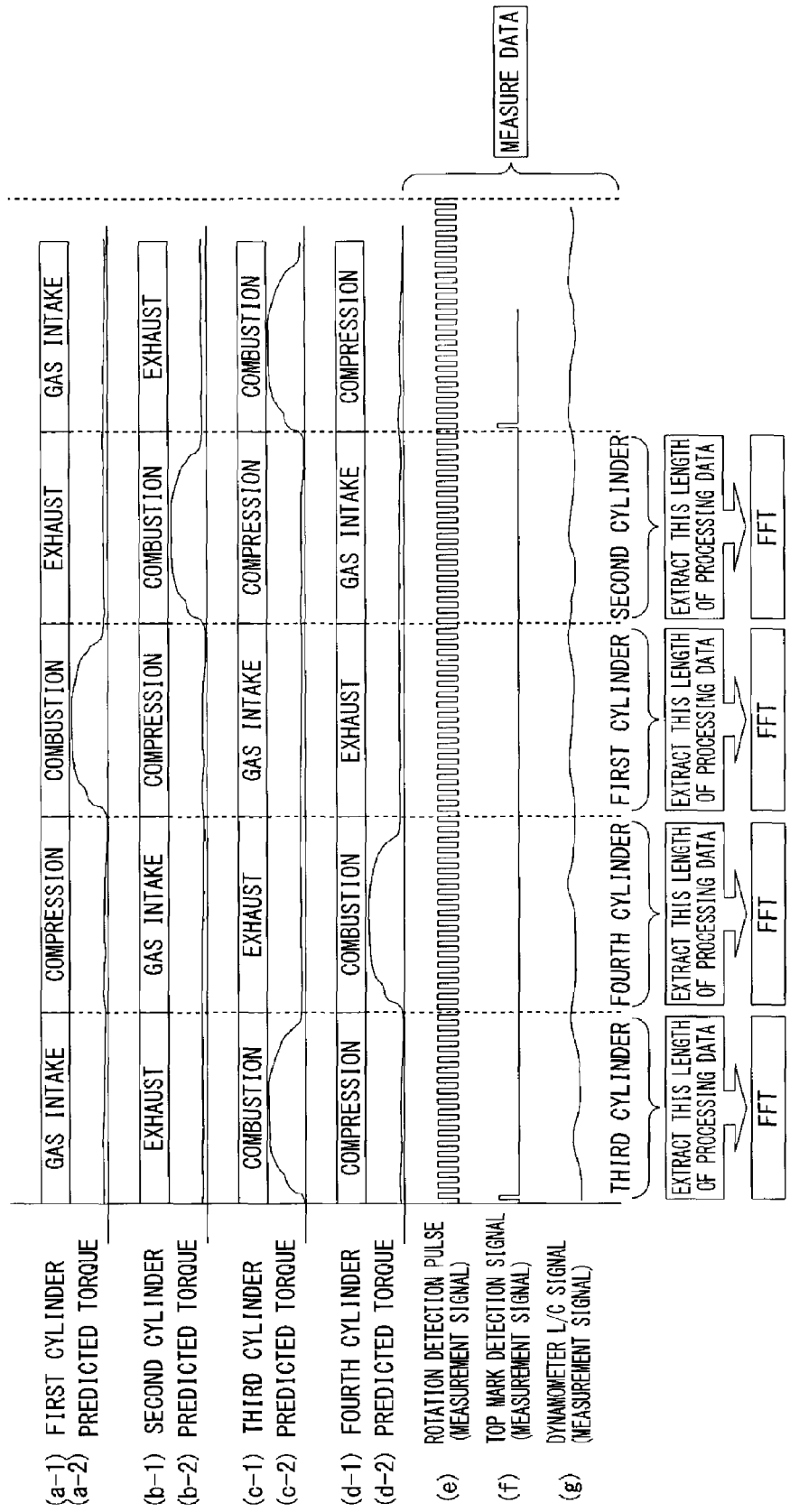

DEVICE AND METHOD FOR MEASURING ENGINE TORQUE AND CONTROL PROGRAM

TECHNICAL FIELD

The present invention relates to a torque measuring device and a method for measuring torque characteristics of each cylinder of an engine having multiple cylinders, and a control program thereof.

BACKGROUND

A variety of devices for estimating the state of an engine have been proposed so far. For example, JP 2006-242146 A, hereinafter Patent Document 1, discloses a combustion pressure detector (inner-cylinder pressure detection means) is provided as an output measuring means. Provision of such a combustion pressure detector for each cylinder allows estimation of each cylinder's output based on a signal obtained from each combustion pressure detector.

However, providing the combustion pressure detector to each cylinder necessitates a cylinder block to be machined and such machining may cause structural fluctuations in the engine itself. Moreover, the combustion pressure detector is expensive and insufficient in strength. An object of the present invention is therefore to predict output (torque) characteristics of each cylinder with a simple arrangement.

SUMMARY

A torque measuring device for an engine is disclosed that includes: a loading means for applying a load to an engine having a plurality of cylinders; an output torque detecting means for detecting as a signal an output torque of the engine to which the load is applied; a rotating member rotation angle detecting means for detecting a rotation angle of a rotating member to which a piston of each cylinder in the engine is connected; a piston rotation angle detecting means for detecting a rotation angle of the piston of each cylinder; and a torque predicting means for predicting a torque characteristic of each cylinder based on the signal of the output torque detected by the output torque detecting means, the rotation angle of the rotating member detected by the rotating member rotation angle detecting means, the rotation angle of the piston of each cylinder detected by the rotating member rotation angle detecting means, and the number of cylinders and the number of cycles of the engine; wherein the torque predicting means predicts as a torque characteristic of each cylinder at least either the peak torque of each cylinder or corresponding combustion angle by which the peak torque is attained .

The torque measuring device for an engine can include the torque predicting means for predicting the peak torque of each cylinder by dividing the signal of the output torque detected by the output torque detecting means in correlation with respective cylinders based on the number of cylinders and number of cycles of the engine and carrying out spectral analysis of frequency components of the divided signal.

The torque measuring device for an engine can further include the torque predicting means for predicting the combustion angle based on the rotation angle of the rotating member, the rotation angle of the piston of each cylinder, and the result of the spectral analysis.

The torque measuring device for an engine can also include the torque predicting means for predicting the peak torque of each cylinder by dividing the signal of the output torque detected by the output torque detecting means by a process constituting one cycle of the engine, and carrying out spectral analysis of frequency components of the divided signal based on the rotation angle of the rotating member, the rotation angle of the piston of each cylinder, and the number of cylinders and number of cycles of the engine.

Furthermore, the torque measuring device for an engine can include the torque predicting means, for predicting the combustion angle based on the result of the spectral analysis.

Also disclosed is a torque measuring method for an engine that includes the steps of: applying a load to an engine having a plurality of cylinders and detecting as a signal an output torque of the engine and detecting a rotation angle of a rotating member to which the piston of each cylinder in the engine is connected and a rotation angle of the piston of each cylinder in the engine; and predicting at least either the peak torque or a combustion angle of each cylinder based on the detected signal of the output torque, the detected rotation angle of the rotating member, the detected rotation angle of the piston of each cylinder, and the number of cylinders and number of cycles of the engine.

Also disclosed is a control program for implementing a function of a torque measuring device for an engine to be executed on a computer, including the steps of: applying a load to an engine having a plurality of cylinders and detecting as a signal an output torque of the engine and detecting as a signal an output torque of the engine having a plurality of cylinders and detecting a rotation angle of a rotating member to which the piston of each cylinder in the engine is connected and a rotation angle of the piston of each cylinder in the engine; and predicting at least either the peak torque or a combustion angle of each cylinder based on the detected signal of the output torque, the detected rotation angle of the rotating member, the detected rotation angle of the piston of each cylinder, and the number of cylinders and number of cycles of the engine.

The disclosed embodiments enable providing at least either the peak torque of each cylinder or the combustion angle at which the peak torque is attained based on the signal of the output torque detected by the output torque detecting means, the rotation angle of the rotating member detected by the rotating member rotation angle detecting means, the rotation angle of the piston of each cylinder detected by the piston rotation angle detecting means, and the number of cylinders and number of cycles of the engine. This allows prediction of torque characteristics of each cylinder with a simple arrangement.

BRIEF DESCRIPTION OF THE DRAWINGS

The description herein makes reference to the accompanying drawings wherein like reference numerals refer to like parts throughout the several views, and wherein:

FIG. 10 is a graph showing an example of a relationship between a spectrum and a combustion angle;

FIG. 12 is a time chart showing an example of a relationship among each stage of each cylinder, rotation detecting pulses, a top mark detecting signal, and a torque detecting signal (dynamometer L/C signal).

DETAILED DESCRIPTION OF EMBODIMENTS

Figure 1:
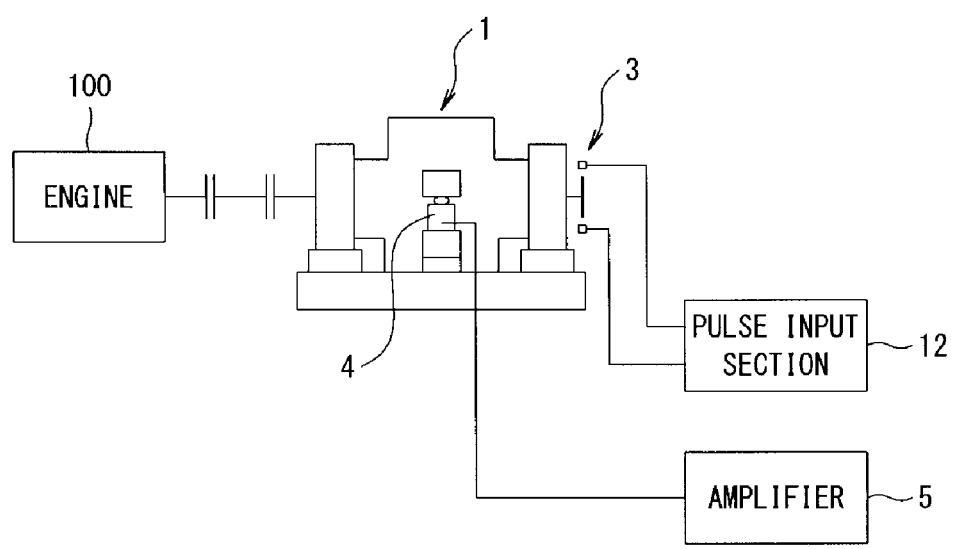
FIG. 1 is a block diagram showing a part of a configuration of a torque measuring device for an engine according to an embodiment of the present invention.
Figure 2:
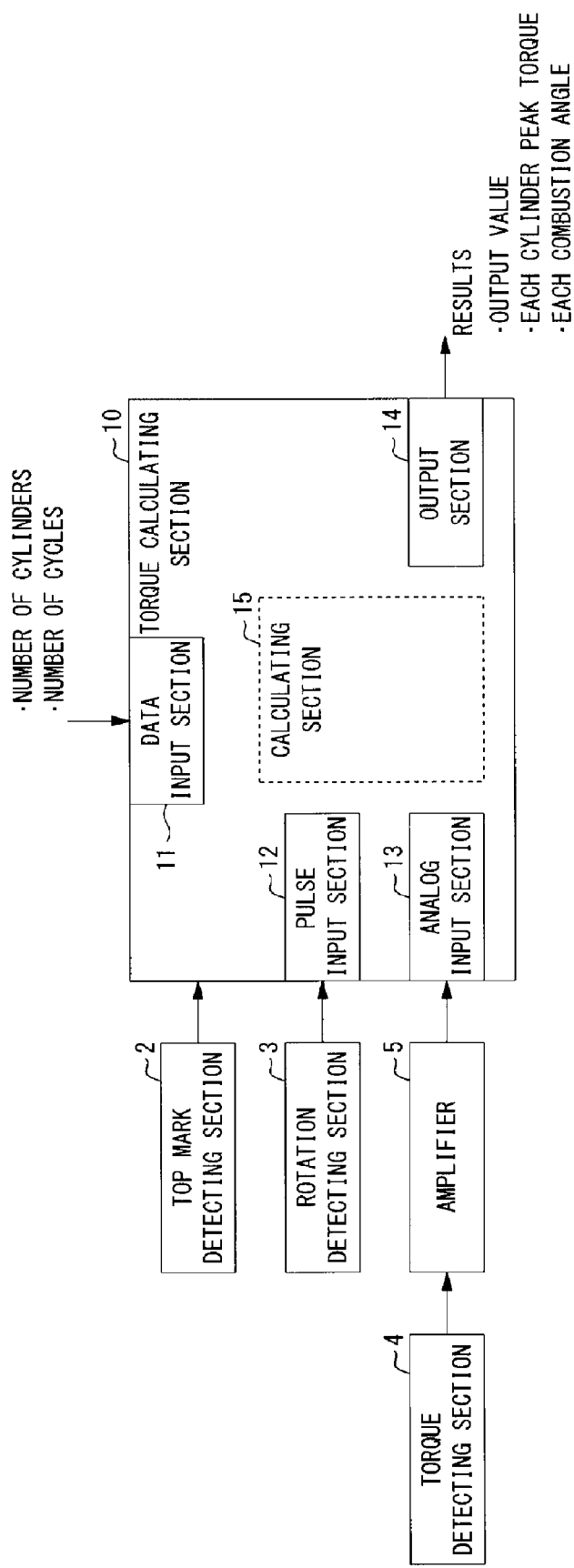
FIG. 2 is another block diagram showing a part of the configuration of a torque measuring device for an engine according to an embodiment of the invention.

Embodiments herein are directed to a torque measuring device for an engine. FIGS. 1 and 2 show a configuration of a torque measuring device for an engine. As shown in FIGS. 1 and 2, the torque measuring device comprises a rotational load 1, a top mark detecting section 2, a rotation detecting section (rotation detector) 3, a torque detecting section (torque detector, load cell) 4, an amplifier 5, and a torque calculating section 10. The torque calculating section 10 comprises a data input section 11, a pulse input section 12, an analog input section 13, an output section 14, and a calculating section 15.

Figure 3:
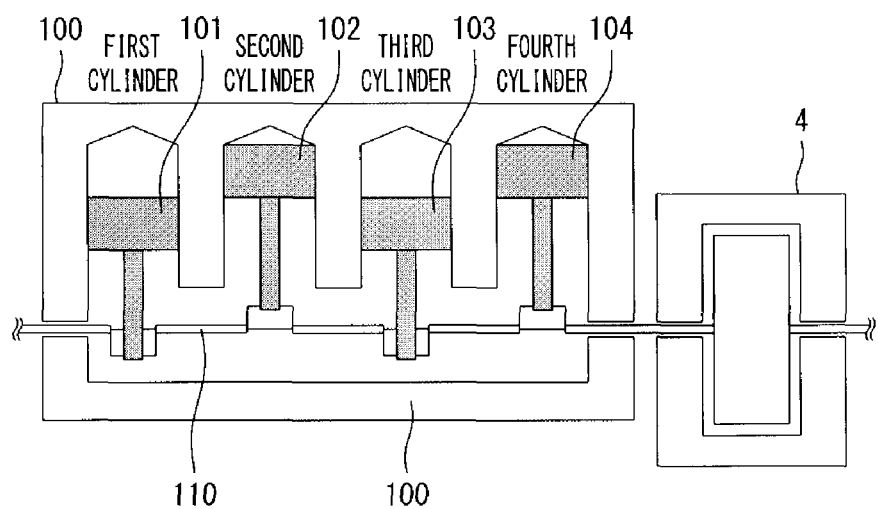
FIG. 3 is a diagram showing an example of the structure of an engine.

FIG. 3 shows an example of the arrangement of an engine 100 to be measured by the torque measuring device. As shown in FIG. 3, the engine 100 is arranged as a four-cylinder engine having four pistons 101, 102, 103, and 104. The four pistons 101, 102, 103, and 104 are connected via a connecting rod to a crank shaft 110, which is a rotating member. According to this embodiment, the engine 100 is a four-cycle engine. The rotational load 1 applies a load on the engine 100. The rotational load 1 may be a screw, for example, which is used for propulsion of vessels. The rotational load 1 is provided with multiple torque absorption elements arranged at fixed rotation angle intervals to absorb the driving torque transmitted from the engine 100.

The top mark detecting section 2 detects top dead centers and bottom dead centers of pistons 101, 102, 103, and 104 in respective cylinders. More specifically, the pistons 101, 102, 103, and 104 of the respective cylinders are connected to the crank shaft (rotating member), and a flywheel (not shown) is attached to the end section of the crank shaft 110. The top mark detecting section 2 put a mark (top mark) at a position of the flywheel corresponding to each of the top dead center and the bottom dead center of each cylinder and then detects those top marks. The top mark detecting section 2 is, for example, configured so as to detect those top marks optically or mechanically (magnet etc.). The top mark detecting section 2 generates a top mark detection signal upon detection of a top mark. The top mark detection signal is a signal used for identifying the top dead center or the bottom dead center of each cylinder (one stroke). The top mark detecting section 2 outputs the generated top mark detection signal to the torque calculating section 10.

The rotation detecting section 3 detects the number of rotations of the engine 100. More specifically, the rotation detecting section 3 comprises a rotor plate (not shown), around which multiple slits are arranged at equal intervals, and a photo interrupter (not shown) converting light passing through the slits into a digital electric signal. The rotation detecting section 3 generates a rotation detection signal (rotation detection pulse) with a frequency proportional to the rotational speed (the number of rotations) of the engine 100. The rotation detecting section 3 then outputs the rotation detection signal to the torque calculating section 10 (pulse input section 12). The rotor plate rotates along with the crank shaft and is, for example, a flywheel.

The torque detecting section 4 detects a point at which the driving torque transmitted from the engine 100 balances with a control torque generated by the rotational load 1. Thereby, the torque detecting section 4 detects the driving torque of the engine 100 and generates an analog torque detection signal. The torque detecting section 4 outputs the torque detection signal to the amplifier 5. The amplifier 5 amplifies the torque detection signal and outputs it to the torque calculating section 10 (analog input section 13).

In the torque calculating section 10, the data input section 11 receives a variety of data of the engine 100. The data input section 11 receives a variety of data from an input section such as a keyboard or a mouse through which the data is input by a user. The variety of data, specifically speaking, includes the number of cylinders (e.g., 4 in this embodiment) and/or the number of cycles (e.g., 4 in this embodiment) of the engine 100.

The calculating section 15 comprises a CPU (Central Processing Unit, and a ROM (Read Only Memory), etc. The calculating section 15 calculates the torque characteristics of each cylinder based on the variety of data from the data input section 11, the rotation detection signal from the pulse input section 12, and the torque detection signal from the analog input section 13. Details of such calculation are as below. A description will be made in conjunction with FIG. 4

To begin with, the calculating section 15 detects a rotation angle based on the rotation detection signal (rotation detection pulse). More specifically, the calculating section 15 detects the rotation angle of the rotating member, such as a crank shaft of the engine 100 or a flywheel (FIGS. 4(a) and 4(b)). Meanwhile, the calculating section 15 obtains the frequency characteristics of the torque fluctuations of the engine 100 through a FFT (Fast Fourier Transform) analysis of the torque signal (dynamometer L/C signal in FIG. 4(c)). The calculating section 15 then detects a peak torque and a combustion angle of each cylinder using the rotation angle, the frequency characteristics of the engine 100, the top mark detection signal and a variety of data (the number of cylinders and the number of cycles). The combustion angle is an angle (crank angle) when seen from a top mark (the top dead center or the bottom dead center) of each cylinder provided based on the top mark detection signal.

Figure 4:
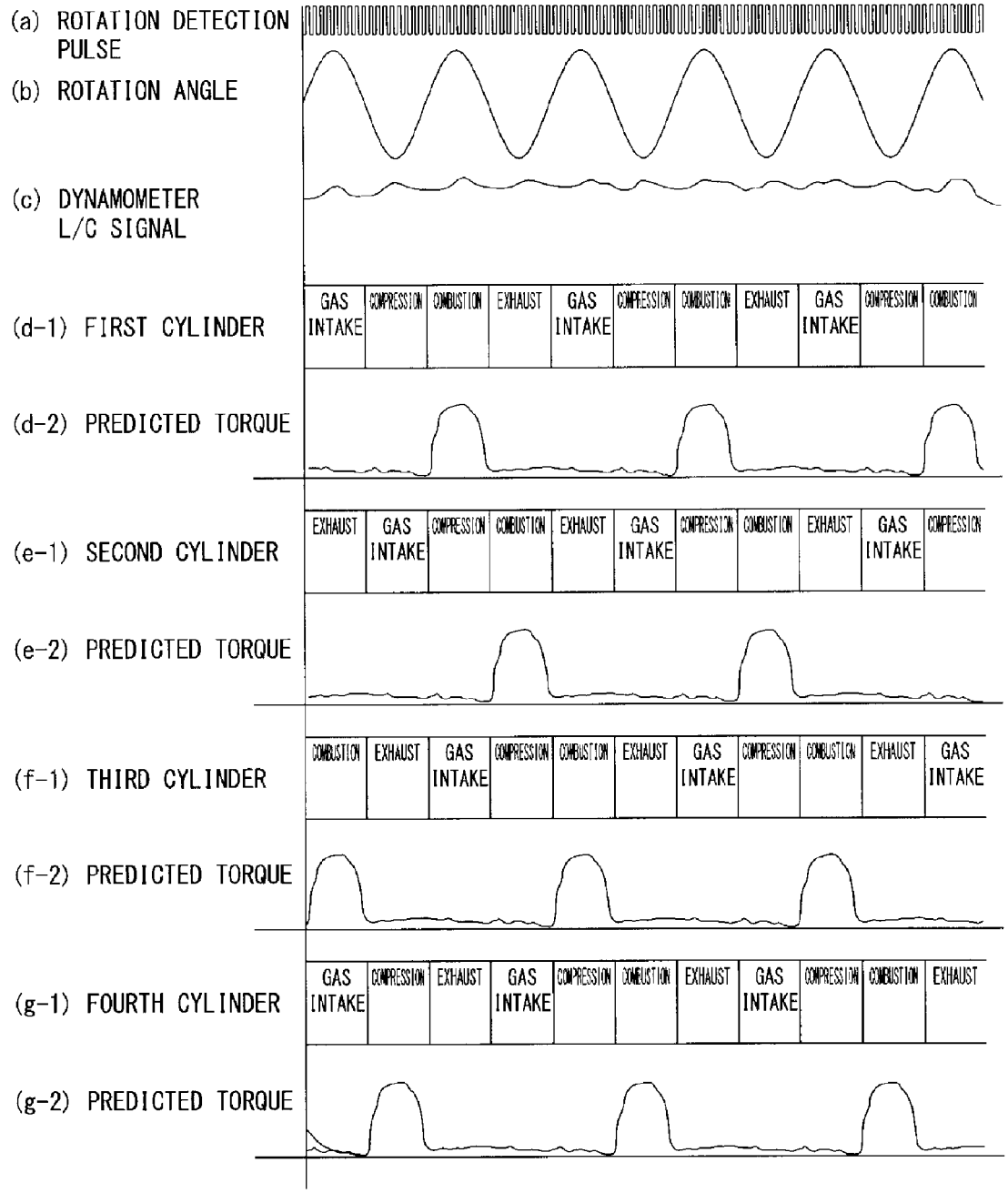
FIG. 4 is a time chart showing a variety of signals.
Figure 5:
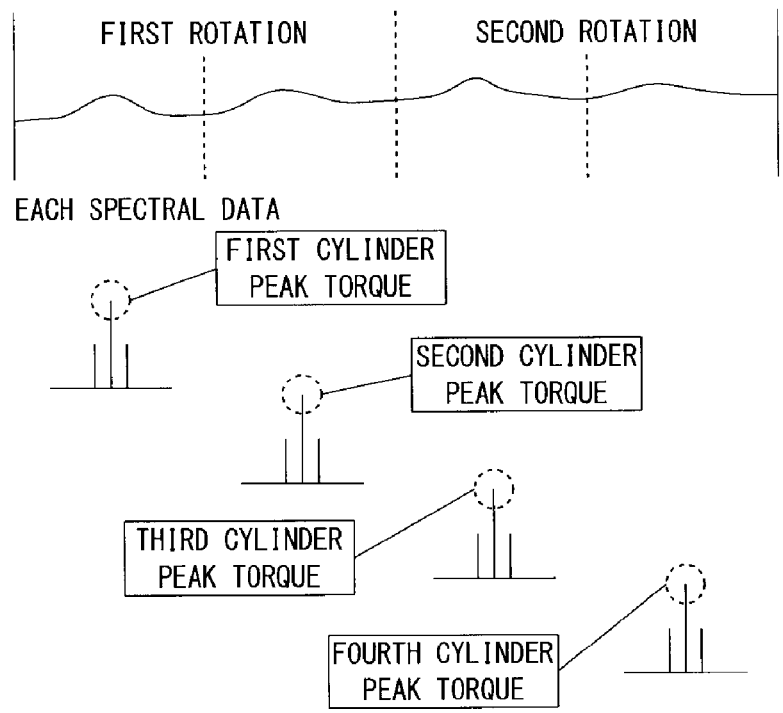
FIG. 5 is a diagram illustrating a peak torque of each cylinder.

More specifically, to detect the peak torque of each cylinder, the calculating section 15 finally detects data of the torque detection signal (torque fluctuations) for one cycle of the engine 100. When the engine 100 is a four-cycle design, the calculating section 15 detects data obtained during two rotations of the crank shaft, during which each cylinder completes its own strokes of one cycle. Note that the data of the torque detection signal (output from the engine 100) contains a combustion output and inertia components (an added component and an absorbed component). Meanwhile, the calculating section 15 predicts a combustion cycle (one cycle) of each cylinder based on the number of cylinders and the number of cycles. As shown in FIGS. 4(d-1), 4(e-1), 4(f-1), and 4(g-1), the calculating section 15 predicts combustion cycles of the respective first to the fourth cylinder. The calculating section 15 divides the detected data of the torque detection signal for the respective cylinders based on the predicted combustion cycles. The calculating section 15 then measures a rotational ratio spectrum for every cycle (every single cycle from 'intake' to 'exhaust') for each cylinder. As a result, the calculating section 15 obtains the peak spectrum for each cylinder and then obtains the peak torque based on the peak spectrum, as shown in FIG. 5.

The calculating section 15 also obtains the combustion angle as an angle (crank angle) for each cylinder when seen from the top mark (top dead center or bottom dead center), based on a relative relationship between the top mark (top mark detection signal) and either rotary angle of the rotating member, such as the crank shaft or the flywheel for the engine 100, or the rotation detection pulse, and also based on a real number and an imaginary number of the spectrum obtained when the aforementioned peak torque is found.

The calculating section 15 can obtain torque fluctuations (predicted torque) for each cylinder, as shown in FIGS. 4(d-2), 4(e-2), 4(f-2), and 4(g-2), based on the peak torque and corresponding combustion angle for each cylinder obtained as described above. The output section 14 outputs an output value (torque detection signal) of the engine 100 and the peak torque and corresponding combustion angle obtained by the torque calculating section 15. Those values output, e.g., from the output section 14 are then output to a display such as a monitor.

Figure 6:
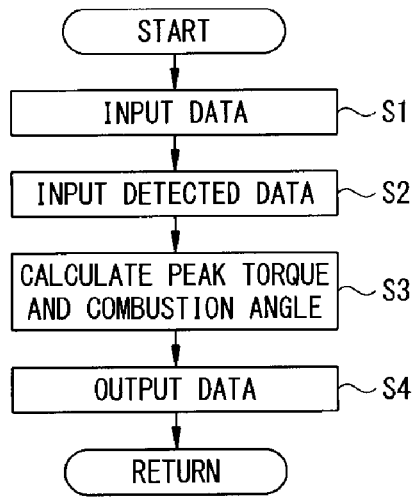
FIG. 6 is a flowchart showing a procedure carried out by the torque measuring device.

The torque measuring device carries our processing while running the engine 100. FIG. 6 shows a processing flow thereof. Firstly, the data input section 11 in the torque measuring device receives a variety of data, such as the number of cylinders or the number of cycles of the engine 100 (step S1), and also receives detected data such as the rotation detection signal (step S2). The torque measuring device calculates the peak torque and corresponding combustion angle for each cylinder of the engine 100 based on the input data as described above (step S3). The torque measuring device then outputs the calculated peak torque and corresponding combustion angle for each cylinder of the engine 100 to the monitor etc. (step S4).

Note that in the present embodiment, the torque detection section 4 acts as an output torque detecting means for detecting as a signal the output torque of the engine having multiple cylinders. The rotation detecting section 3 acts as a rotating member rotation angle detecting means for detecting the rotation angle of the rotating member to which the piston of each cylinder of the engine is connected. The top mark detecting section 2 acts as a piston rotation angle detecting means for detecting the rotation angle of the piston for each cylinder. The torque calculating section 10 acts as a torque predicting means for predicting torque characteristics of each cylinder based on the output torque signal detected by the output torque detecting means, the rotation angle of the rotating member detected by the rotating member rotation angle detecting means, the rotation angle of the piston for each cylinder detected by the piston rotation angle detecting means, and the number of cylinders and the number of cycles of the engine.

In the present embodiment, the torque predicting means predicts at least either the peak torque of each cylinder or the combustion angle for the peak torque as a torque characteristic of each cylinder. Furthermore, in the embodiment, an engine torque measuring method including the following steps is described. That is, the steps include a step of detecting as a signal the output torque of the engine having multiple cylinders and also detecting the rotation angle of the rotating member to which the piston for each cylinder of the engine is connected and rotation angle of the piston for each cylinder, and a step of predicting at least either the peak torque of each cylinder or the combustion angle based on the detected output torque signal, the rotation angle of the rotating member, the rotation angle of the piston for each cylinder, and the number of cylinders and number of cycles of the engine.

Moreover, in the present embodiment, the control program for implementing the function of the torque measuring device for the engine to be executed by a computer, which includes the following steps. That is, the steps include a step of detecting as a signal the output torque of the engine having multiple cylinders and also detecting the rotation angle of the rotating member to which the piston for each cylinder of the engine is connected and rotation angle of the piston for each cylinder, and a step of predicting at least either the peak torque of each cylinder or the combustion angle based on the detected output torque signal, the rotation angle of the rotating member, the rotation angle of the piston for each cylinder, and the number of cylinders and number of cycles of the engine. The control program may implement for example, the top mark detecting section 2, the rotation detecting section 3, the torque detecting section 4, and the amplifier 5, and the torque calculating section 10.

(1) The torque measuring device predicts at least either the peak torque of each cylinder or corresponding combustion angle based on the torque detection signal of the engine 100 having multiple cylinders, the rotation angle (rotation detection signal) of the rotating member, to which the pistons 101, 102, 103, and 104 of the respective cylinders of the engine 100 are connected, the rotation angles (top mark detection signals) of the pistons 101, 102, 103, and 104 in the respective cylinders, and the number of cylinders and the number of cycles of the engine 100. This allows the torque measuring device to predict the peak torque of each cylinder and corresponding combustion angle with a simple arrangement without providing a combustion pressure detector for each cylinder.

Thereby, the torque measuring device can measure the peak torque of each cylinder of the engine, as a single dynamometer that is an engine output performance measuring device for measuring performance generally called an output (power), which is calculated by subtracting 'cooling loss', 'exhaust loss', and 'mechanical loss' from the combustion power of the engine. Thus, the torque measuring device can easily grasp the combustion state, achieving easy adjustment of the fuel amount supplied to each cylinder, thereby keeping the combustion state of the engine at the best conditions.

(2) The torque measuring device divides the torque detection signal in correlation with the respective cylinders based on the number of cylinders and the number of cycles of the engine 100, and then conducts spectral analysis the frequencies of the divided signals, thereby predicting the peak torque for each cylinder. This allows the torque measuring device to easily predict the peak torque of each cylinder.

(3) The torque measuring device predicts the combustion angle, which provides the peak torque for each cylinder, based on the rotation angle (rotation detection signal) of the rotating member, the rotation angles (top mark detection signals) of the pistons 101, 102, 103, and 104 in the respective cylinders, and the results of the spectral analysis. This allows the torque measuring device to easily predict the combustion angle.

Figure 7:
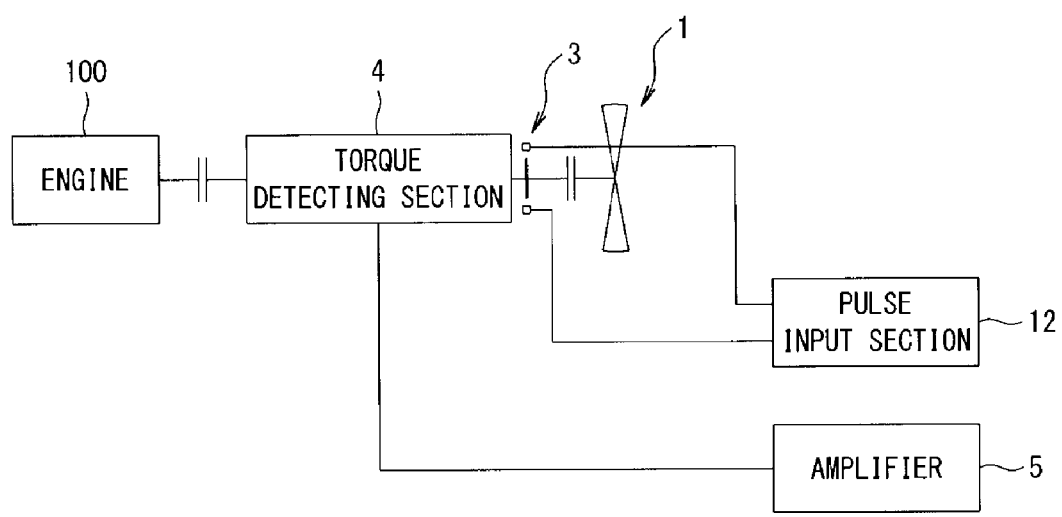
FIG. 7 is a block diagram showing another configuration of a rotational load.

(1) As shown in FIG. 7, the rotational load 1 may be configured by a screw used for propulsion of vessels. In this case, a rotational resistance developed by fluid may be applied on the screw, thereby yielding a rotational load.

(2) In the present modification, the top mark detecting section 2 detects the top mark put at a position of the flywheel corresponding to the ton dead center or the bottom dead center of each cylinder and generates a top mark detection signal according to the detected top mark. However, such a top mark detection signal is not limited to be generated by such an arrangement of the top mark detecting section 2. That is, the top mark detection signal may be of any form as long as it can identify the top dead center or the bottom dead center of each cylinder, or a specific stage or a specific action of the engine. This is because, for example, even if such a top mark detection signal is generated with two strokes of the engine (cylinders) (i.e., per rotation of the crank shaft) as a unit, the top dead center or the bottom dead center of each cylinder, or a specific stage or a specific action of the engine can be specified based on the relationship between the top mark detection signal and the rotation detection pulse.

Figure 8:
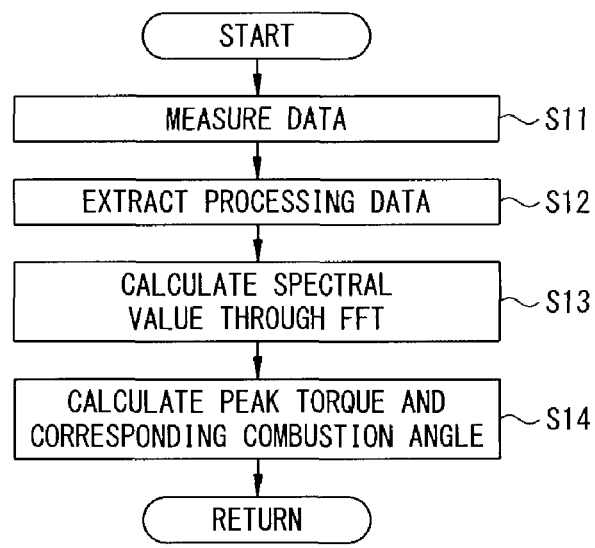
FIG. 8 is a flowchart showing a procedure for obtaining the peak torque and the combustion angle of each cylinder based on a top mark detection signal per stroke constituting a cycle of the a four-cycle engine.
Figure 9:
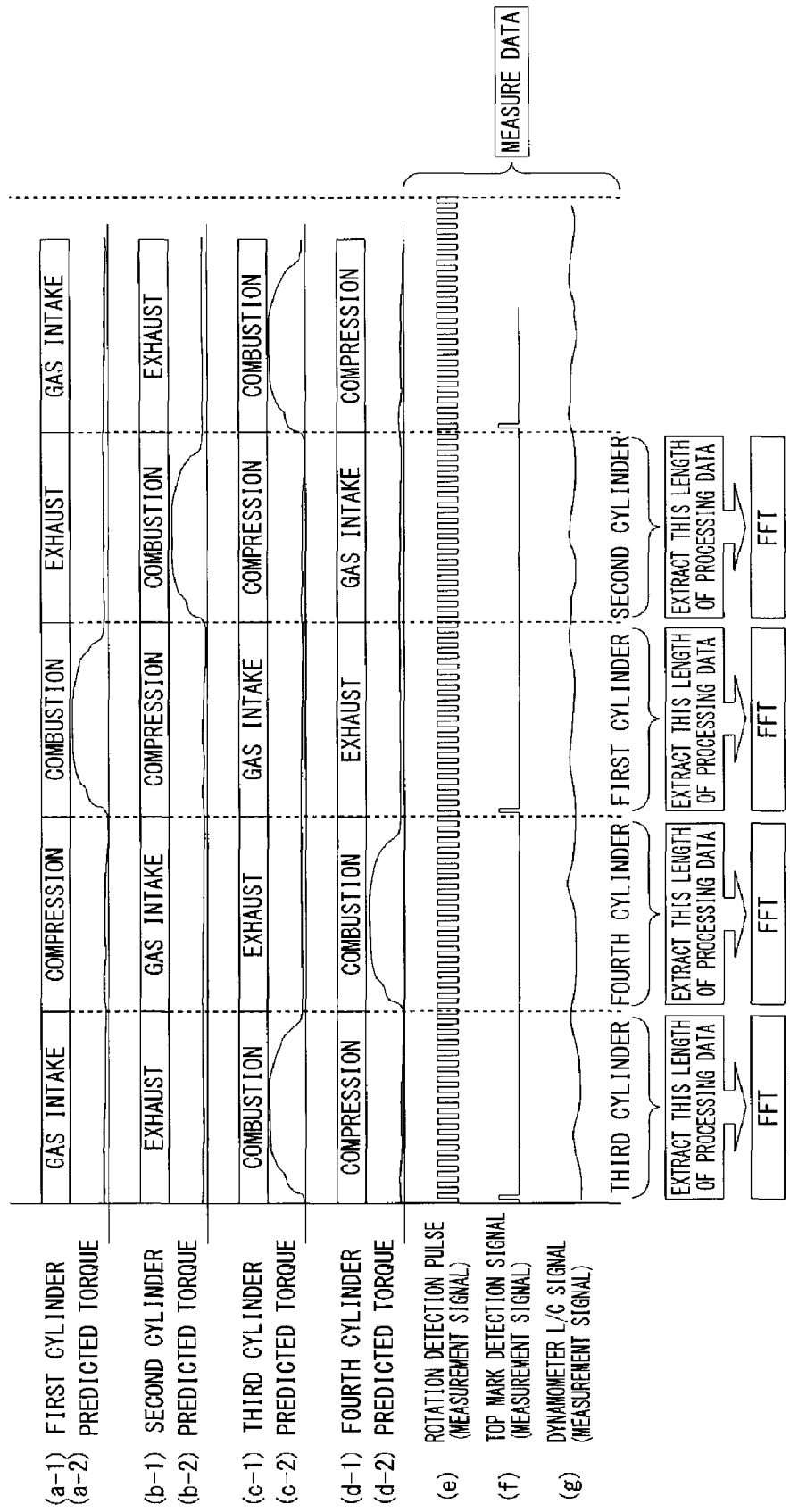
FIG. 9 is a time chart showing an example of a relationship among each stroke of each cylinder, rotation detecting pulses, a top mark detecting signal, and a torque detecting signal (dynamometer L/C signal)

(3) The torque measuring device can also find the peak torque and corresponding combustion angle of each cylinder based on the top mark detection signal per strokes (i.e., stage, action, or a half rotation of the crank shaft) constituting one cycle of the four-cycle engine. FIG. 8 shows procedure thereof. This procedure will be described with reference to FIGS. 9 and 10. FIG. 9 shows an example of a relationship among stages of intake stroke, compression stroke, combustion stroke, and exhaust stroke (each stage or each section) of each cylinder, the rotation detection pulse, the top mark detection signal, and the torque detection signal (dynamometer L/C signal). FIG. 10 shows an example of a relationship between the spectrum and the combustion angle.

As shown in FIG. 8, in step S11, the torque measuring device firstly measures data. More specifically, the rotation detecting section 3 generates a rotation detection signal (rotation detection pulse) in the same manner as the preceding description, and outputs the generated rotation detection signal (FIG. 9(*e*)) to the torque calculating section 10. The top mark detecting section 2, detects a top mark and outputs a top mark detection signal in the same manner as the preceding description (FIG. 9(*f*)) to the torque calculating section 10. The torque detecting section 4, generates, in the same manner as the preceding description, a torque detection signal and outputs the generated torque detection signal (amplified torque detection signal shown in FIG. 9(*g*)) to the torque calculating section 10. The top mark detecting section 2, as shown in FIG. 9(*f*), generates the top mark detection signal per two strokes (i.e., per rotation of the crank shaft). Furthermore, the top mark detecting section 2 can also generate the top mark detection signal from the rotation angle found based on the rotation detection signal (rotation detection pulse).

Next, in step S12, the torque detecting device extracts processing data. More specifically, the calculating section 15 of the torque calculating section 10 extracts data (hereinafter, called as processing data) of a predetermined length (corresponding to a single stroke or a half rotation of the crank shaft) from the torque detection signal (FIG. 9(*g*)) based on rotation detection signal (FIG. 9(*e*)) and the top mark detection signal (FIG. 9(*f*)). That is, the calculating section 15 specifies a predetermined zone of the torque detection signal (FIG. 9(*g*)) taking the top mark detection signal (FIG. 9(*f*)) as a reference signal, and extracts the specified predetermined zone of the torque detection signal (FIG. 9(*g*)) as processing data. At this time, the calculating section 15 continuously extracts the processing data by the number corresponding to the cylinders. In the case of the four-cylinder engine as the embodiment, the calculating section 15 continuously extracts at least four processing data.

Next, in step S13, the torque measuring device calculates a spectral value through FFT. That is, the calculating section 15 applies FFT processing to the processing data (multiple each processing data) extracted in the previous step S12 to the FFT to calculate the spectral value.

Subsequently, in step S14, the torque measuring device calculates the peak torque and corresponding combustion angle. More specifically, the calculating section 15 calculates the peak torque based on the spectrum peak calculated in the previous step S13. Furthermore, the calculating section 15 calculates the combustion angle, with which the peak torque is found, based on the real number and the imaginary number of the spectrum calculated in previous step S13, as shown in FIG. 10.

At this time, the calculating section 15 calculates the peak torque and the combustion angle in correlation with each cylinder. For this reason, the calculating section 15 correlates the processing data extracted per one stroke in the previous step S12 with the respective cylinders, each coming to the combustion stroke in each stroke concerned. The calculating section 15 predicts the combustion period (one cycle) of each cylinder based on the number of cylinders and the number of cycles as described above. The calculating section 15 predicts, for example, the combustion cycles of the first to the fourth cylinder, as shown in FIGS. 9(*a*-1), 9(*b*-1), 9(*c*-1), and 9(*d*-1). The calculating section 15 correlates the processing data with the respective cylinders, which comes to the combustion stroke in the predicted combustion cycle. The calculating section 15 correlates, for example, the first extracted processing data with the third cylinder in the combustion stroke in the example of FIG. 9.

By the above approach, the calculating section 15 allows calculating the peak torque and corresponding combustion angle in correlation with each cylinder. The calculating section 15 can calculate the torque fluctuations (predicted torque) for each cylinder based on the thus calculated peak torque and corresponding combustion angle for each cylinder, as shown in FIGS. 9(*a*-2), 9(*b*-2), 9(*c*-2), and 9(*d*-2).

(4) In the present embodiment, a four-cylinder four-cycle engine is described as an example. Alternatively, the present invention may be applied to engines with cylinders less than or more than four cylinders, or to two-cycle engines.

(5) The torque measuring device can also detect the peak torque and corresponding combustion angle of each cylinder in a two-cycle engine by using the rotation angle, the frequency characteristics of the engine, and the top mark detection signal and the variety of data (i.e., the number of cylinders and number of cycles) in the same manner as in the procedure for the four-cycle engine (described referring to FIG. 4).

Figure 11:
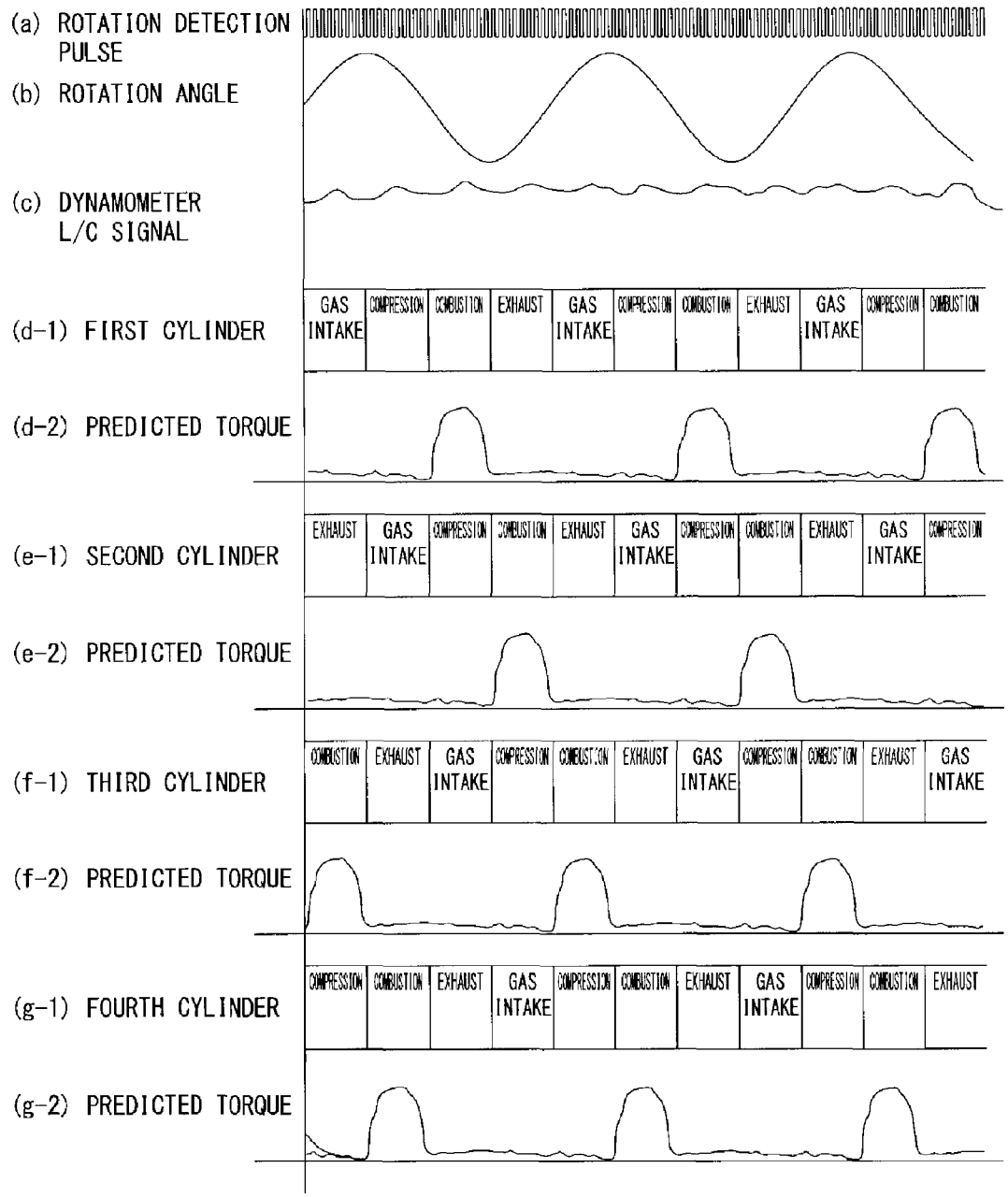
FIG. 11 is a time chart showing a variety of signals obtained from a two-cycle engine.

FIG. 11 corresponds to FIG. 4 showing the four-cycle engine, and shows an example of a relationship among the rotation detection pulse, the rotation angle, and the torque detection signal (dynamometer L/C signal) of the two-cycle engine, and each process of each cylinder (i.e., intake, compression stroke, combustion stroke, and exhaust stroke).

(6) The torque measuring device can also obtain the peak torque and corresponding combustion angle of each cylinder based on the top mark detection signal per process (action or a quarter rotation of the crank shaft) constituting one cycle of the two-cycle engine. In this case, the torque measuring device can obtain the peak torque and corresponding combustion angle of each cylinder even by a two-cycle engine following the same manner as the procedure as that in FIG. 8 showing the procedure of the four-cycle engine.

FIG. 12 corresponds to FIG. 9 showing the four-cycle engine, and shows an example of a relationship in the two-cycle engine, among the processes of intake stroke, compression stroke, combustion stroke, and exhaust stroke (each action) of each cylinder, and the rotation detection pulse, the top mark detection signal, and the torque detection signal (dynamometer L/C signal). The top mark detection section 2 generates the top mark detection signal per two strokes (i.e., per rotation of the crank shaft) as shown in FIG. 12(f).

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A torque measuring device for an engine, comprising:
a loading means for applying a load to an engine having a plurality of cylinders;
an output torque detecting means for detecting as a signal an output torque of the engine to which the load is applied;
a rotating member rotation angle detecting means for detecting a rotation angle of a rotating member to which a piston of each cylinder in the engine is connected;
a top mark detecting means for detecting at least one of a top dead center or a bottom dead center of the piston of each cylinder; and
a torque predicting means for predicting a torque characteristic of each cylinder based on the signal of the output torque detected by the output torque detecting means, the rotation angle of the rotating member detected by the rotating member rotation angle detecting means, the at least one of the top dead center or the bottom dead center of the piston of each cylinder detected by the top mark detecting means, and the number of cylinders and the number of cycles of the engine; wherein
the torque predicting means predicts as a torque characteristic of each cylinder at least either a peak torque of each cylinder or a corresponding combustion angle by which the peak torque is attained.

2. The torque measuring device for the engine according to claim 1, wherein the torque predicting means predicts the peak torque of each cylinder by dividing the signal of the output torque detected by the output torque detecting means in correlation with respective cylinders based on the number of cylinders and number of cycles of the engine and carrying out spectral analysis of frequency components of the divided signal.

3. The torque measuring device for the engine according to claim 2, wherein the torque predicting means predicts the combustion angle based on the rotation angle of the rotating member, the at least one of the top dead center or the bottom dead center of the piston of each cylinder, and the result of the spectral analysis.

4. The torque measuring device for the engine according to claim 1, wherein the torque predicting means predicts the peak torque of each cylinder by dividing the signal of the output torque detected by the output torque detecting means by a process constituting one cycle of the engine, and carrying out spectral analysis of frequency components of the divided signal based on the rotation angle of the rotating member, the at least one of the top dead center or the bottom dead center of the piston of each cylinder, and the number of cylinders and number of cycles of the engine.

5. The torque measuring device of the engine according to claim 4, wherein the torque predicting means predicts the combustion angle based on the result of the spectral analysis.

* * * * *